Dec. 21, 1926. 1,611,392

F. L. THOMPSON

DIRIGIBLE LAMP MOUNTING FOR AUTOMOBILES

Filed May 28, 1925 2 Sheets-Sheet 1

Inventor
Frank L. Thompson
By Shepherd & Campbell
Attorney

Dec. 21, 1926.
F. L. THOMPSON
1,611,392
DIRIGIBLE LAMP MOUNTING FOR AUTOMOBILES
Filed May 28, 1925     2 Sheets-Sheet 2
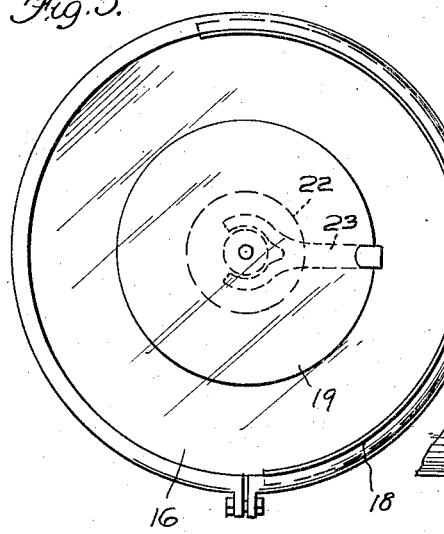
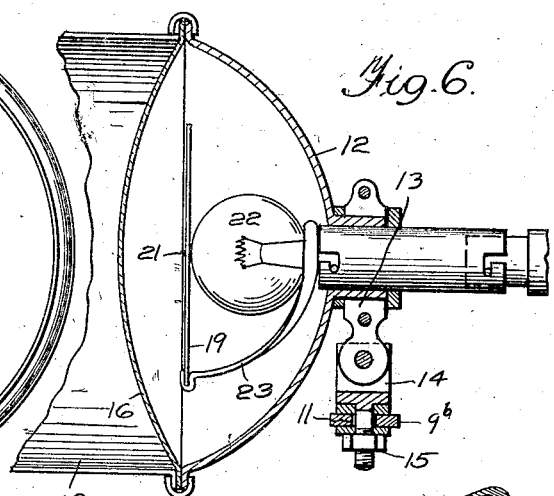
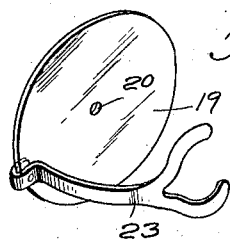
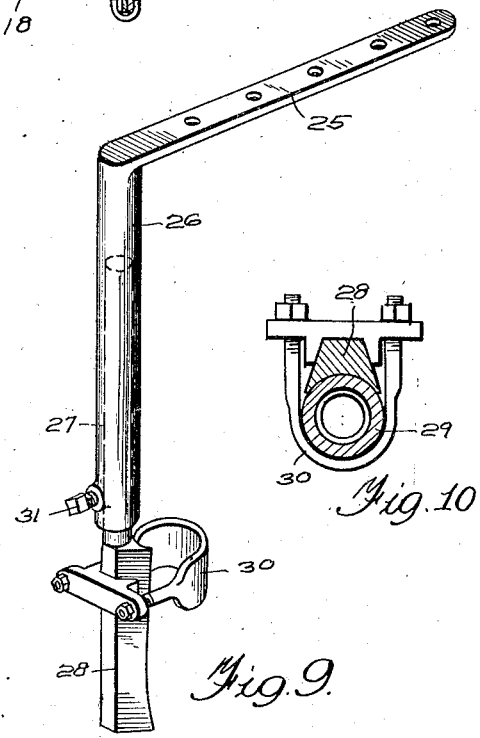
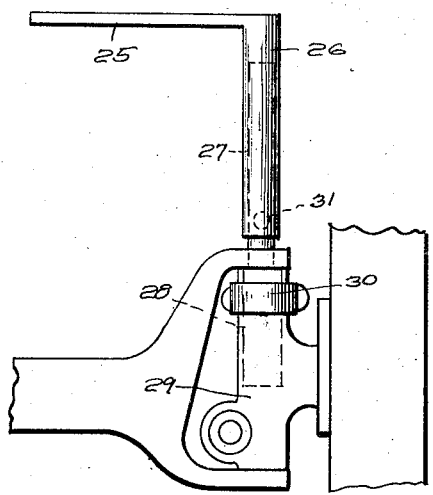
Inventor
Frank L. Thompson
By Shepherd & Campbell
Attorney Patented Dec. 21, 1926.

1,611,392

UNITED STATES PATENT OFFICE.

FRANK L. THOMPSON, OF OKLAHOMA CITY, OKLAHOMA.

DIRIGIBLE LAMP MOUNTING FOR AUTOMOBILES.

Application filed May 28, 1925. Serial No. 33,448.

This invention relates to a dirigible lamp mounting for automobiles and it has for its object to provide an improved construction wherein the lamp will turn automatically with front wheels to illuminate the roadway around curves. A further object of the invention is to provide a structure of the character indicated which will be so arranged that it will constitute a non-glare device with respect to the drivers of approaching cars.

Further objects and advantages of the invention will be set forth in the detailed description which follows:

In the accompanying drawings, wherein like reference characters designate corresponding parts throughout the several views;

Fig. 5 is a front elevation of one of the lamps.

Fig. 6 is a vertical sectional view through one of the lamp mountings and the non-glare device of the lamp.

Fig. 7 is a perspective view of the non-glare device.

Fig. 8 is a front elevation illustrating a modified form of lamp mounting.

Fig. 9 is a perspective view of the lamp mounting shown in Fig. 8, and

Fig. 10 is a horizontal sectional view through one of the steering spindles and the attached lamp mounting, the construction corresponding to that shown in Fig. 9.

Figure 1:
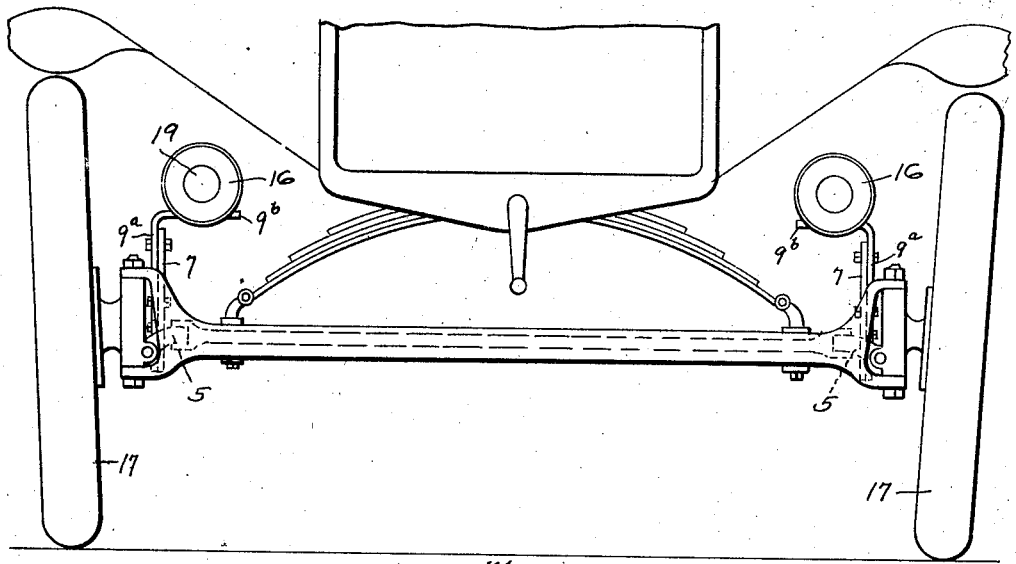
Fig. 1 is a front elevation of a portion of an automobile having the invention applied thereto.
Figure 2:
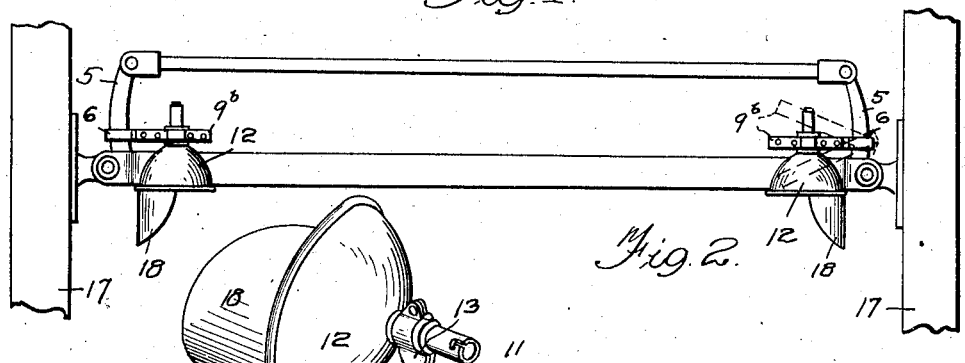
Fig. 2 is a plan view of the structure shown in Fig. 1.
Figures 3, 4:
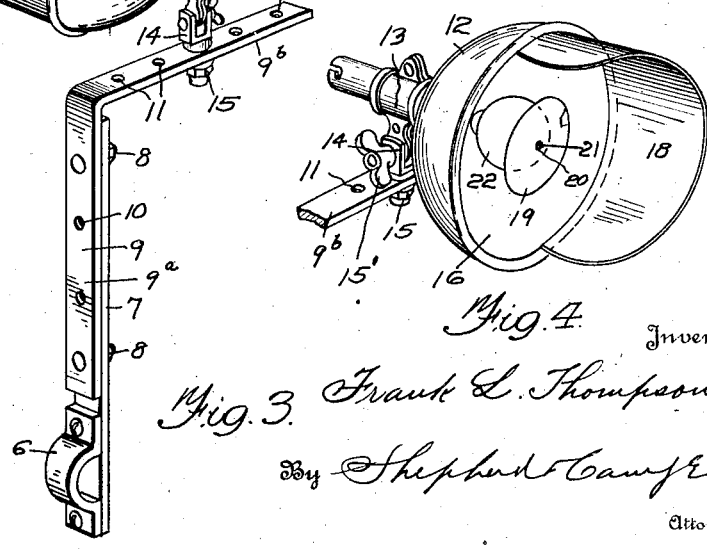
Fig. 3 is a perspective view of one of the lamp mountings hereinafter described.
Fig. 4 is a perspective view of one of the lamps looking from the front.

Referring to the drawings and more particularly to Figs. 1 to 4 inclusive, 5 designates the steering knuckle arms of a well known type of automobile. I secure to the steering knuckle arm, by the clamp indicated at 6, a vertical strap 7 and I attach to these vertical straps, by means of the nuts and bolts indicated at 8, L-shaped members 9, comprising the vertical arms 9$^a$ and the horizontal arm 9$^b$. Each of these arms is provided with a plurality of openings 10 and 11, the provision of the plurality of openings 10 rendering it possible to vertically adjust the arm 9 with respect to the strap 8 and the provision of the openings 11 rendering it possible to adjust the lamp along the arms 9$^b$. The lamp bodies are indicated at 12 and they are carried by brackets 13 which are pivotally mounted in bifurcated stems 14, said stems in turn being secured in the openings 11 by means of nuts 15. Thus, as the steering knuckle arms 5 swing back and forth, the lamps will partake of their movement and will be turned to such position as to throw their rays in the direction in which the vehicle is about to turn. Thumb nuts 15 serve to adjust the angle of the lamps with respect to the vertical.

To shield the lenses 16 of the lamps from mud and water splashed from the front wheels 17 of the automobile, I dispose shields 18 at the sides of said lamps. These shields aid in preventing objectionable glare laterally of the roadway. As a further preventive of glare, I mount within the lamps translucent or semi-transparent discs 19 (see Fig. 7). These discs are preferably made of celluloid and they are provided with central openings 20, which receive the usual tip 21 upon the lamp globe 22. The discs 19 are carried by forked brackets 23 of spring metal which engage beneath the bases of the globe 22 and hold the structure in place.

The structure of Figs. 8 to 10 is the same in function as that of Figs. 1 to 4, the horizontal perforated arm 25 corresponding to the arm 9$^b$. This arm 25 is carried by a vertical tubular stem 26 which fits over a rod-like extension 27 of a block 28. This block is shaped to fit against the side of the steering spindle 29 and it is clamped thereto by the clamp 30 which embraces said spindle. A set screw 31 provides means for effecting bodily vertical adjustment of tubular member 26 and arm 25 with respect to block 28.

From the foregoing description, it will be observed that I have provided a structure for possessing all of the advantages of dirigible lamp mountings without the necessity of the complicated and noisy connections between the running gear and the body of the vehicle, such as are necessary when an effort is made to connect the steering gear with lamps mounted upon the body of the vehicle. Since all of the structure is mounted upon a running gear, intermediate connections are entirely dispensed with. Furthermore, the locating of the lamps at a low point disposes them so far below the range of vision of drivers of oncoming cars that objectionable glare is not present.

It is to be understood that the invention is not limited to the precise construction set forth but that it includes within its purview whatever changes fairly come within either the terms or the spirit of the appended claims.

Having described my invention, what I claim is:

1. A device of the character described comprising a vertical flat bar, a clamp carried thereby, adapted to engage the steering knuckle arm of an automobile steering wheel to hold said bar in vertical position, an L-shaped member of flat metal, one leg of which lies flat against said vertical bar and is secured thereto by means permitting vertical adjustment of said leg with respect to said bar, said horizontal portion of the L-shaped member being provided with a plurality of vertical openings therethrough, a lamp, a member carrying said lamp and adapted to be mounted in any of said vertical openings and to permit of horizontal swinging movement of the lamp, and a mud shield projecting forwardly from the lamp and extending part way around the front thereof and lying at that side of the lamp toward the vertical bar.

2. The combination with an automobile, having the usual front guiding wheels and front fenders of a lamp mounted upon and movable with one of the automobile steering knuckle arms, said lamp being located beneath the front fender and inwardly of and below the top of the adjacent steering wheel, a mud shield extending forwardly from the edge of the lamp and substantially half way therearound and lying about that side of the lamp toward the adjacent steering wheel, whereby said shield serves to prevent the passage of light rays outwardly beyond said lamp and also serves to prevent mud from the wheel from being splashed upon the lens of the lamp.

In testimony whereof I affix my signature.

FRANK L. THOMPSON.